(12) United States Patent
Park et al.

(10) Patent No.: US 9,841,949 B2
(45) Date of Patent: Dec. 12, 2017

(54) APPARATUS AND METHOD FOR STABILIZING OUTPUT SEQUENCE OF REAL RANDOM NUMBER GENERATOR

(71) Applicant: ELECTRONICS AND TELECOMMUNICATIONS RESEARCH INSTITUTE, Daejeon (KR)

(72) Inventors: Sun-Chun Park, Daejeon (KR); Hyung-Yul Ryu, Daejeon (KR); Young-Jun Cho, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 449 days.

(21) Appl. No.: 14/614,544

(22) Filed: Feb. 5, 2015

(65) Prior Publication Data

US 2015/0227344 A1 Aug. 13, 2015

(30) Foreign Application Priority Data

Feb. 12, 2014 (KR) .................. 10-2014-0015806

(51) Int. Cl.
*G06F 7/58* (2006.01)
*G06N 7/02* (2006.01)

(52) U.S. Cl.
CPC .............. *G06F 7/588* (2013.01); *G06F 7/58* (2013.01); *G06N 7/02* (2013.01)

(58) Field of Classification Search
CPC ............................................ G06F 7/58–7/588
See application file for complete search history.

(56) References Cited

U.S. PATENT DOCUMENTS

| 4,853,884 A | * | 8/1989 | Brown | .................... G06F 7/588 |
| | | | | 331/78 |
| 6,675,113 B2 | * | 1/2004 | Hars | ........................ G06F 7/58 |
| | | | | 702/75 |

(Continued)

FOREIGN PATENT DOCUMENTS

| JP | 06-175855 A | 6/1994 |
| KR | 10-2004-0085608 A | 10/2004 |
| KR | 10-2007-0018986 A | 2/2007 |

OTHER PUBLICATIONS

The Distributed Systems Group, "Random Number Generators—An evaluation and comparison of Random.org and some commonly used generators", Project Report prepared by Charmaine Kenny, Trinity College Dublin, Apr. 2005.*

(Continued)

*Primary Examiner* — Matthew Sandifer
(74) *Attorney, Agent, or Firm* — LRK Patent Law Firm

(57) ABSTRACT

An apparatus and method that stabilizes an output sequence of a real random number generator by adjusting the input voltage of the random number generator or the comparative voltage of a comparator. The apparatus for stabilizing an output sequence of a real random number generator includes a verification unit for performing a monobit test on random number values sampled by and output from a comparison unit, and calculating an impact value. An adjustment unit adjusts a voltage of any one of a random number generation unit and the comparison unit using resulting values of the monobit test and the impact value output from the verification unit.

10 Claims, 7 Drawing Sheets

(56) References Cited

U.S. PATENT DOCUMENTS

| | | | | |
|---|---|---|---|---|
| 2007/0067375 A1* | 3/2007 | Inaoka | ..................... | G06F 7/58 |
| | | | | 708/250 |
| 2009/0165086 A1 | 6/2009 | Trichina et al. | | |
| 2010/0005128 A1* | 1/2010 | Ergun | ..................... | G06F 7/58 |
| | | | | 708/251 |
| 2010/0057820 A1* | 3/2010 | Matsumoto | ............ | G06F 7/588 |
| | | | | 708/250 |

OTHER PUBLICATIONS

Menezes A J et al., "Handbook of Applied Cryptography," 1997, CRC Press, Boca Raton, FL, USA, XP002252330, pp. 181-182.

Saitoh Y et al.,"Generation of Physical Random Numbers With a Variable-Capacitor Parametron," Electronics & Communications in Japan, Part III—Fundamentalelectronic Science, vol. 86, No. 2, Part 03, 2002, pp. 24-32, XP001132383, Wiley, Hoboken, NJ, USA.

\* cited by examiner

| RULE NUMBER | IF MONO TEST VALUE | THEN MODIFICATION VALUE |
|---|---|---|
| RULE 1 | LOW | LOW |
| RULE 2 | HIGH | HIGH |

APPARATUS AND METHOD FOR STABILIZING OUTPUT SEQUENCE OF REAL RANDOM NUMBER GENERATOR

CROSS REFERENCE TO RELATED APPLICATION

This application claims the benefit of Korean Patent Application No. 10-2014-0015806 filed Feb. 12, 2014, which is hereby incorporated by reference in its entirety into this application.

BACKGROUND OF THE INVENTION

1. Technical Field

The present invention generally relates to an apparatus and method for stabilizing the output sequence of a real random number generator and, more particularly, to an apparatus and method for stabilizing the output sequence of a real random number generator that is used in security systems.

2. Description of the Related Art

The core of a real random number generator for generating an output sequence (key sequence) is to provide statistical randomness. Generally, a real random number generator uses unpredictable, uncopyable, and non-deterministic noise sources that may be extracted from a natural phenomenon.

A real random number generator that uses an analog noise source may generate biased random numbers due to a surrounding environment or device aging.

That is, since the characteristics of a real random number generator change every moment, the entropy of an output sequence may be decreased.

In other words, if a surrounding environment and condition are satisfied, such a real random number generator generates unbiased random numbers, but if the surrounding environment is deteriorated or aged, predictable random numbers having a specific pattern may be generated. In this case, security systems that use predictable random numbers become vulnerable to external attacks.

As related preceding technology, Korean Patent Application Publication No. 2004-0085608 (entitled "Method and Apparatus of Generating Random Number Using Electronic Circuit Noise") discloses technology that provides statistical randomness suitable for a random number generation apparatus implemented using hardware including electronic circuits.

SUMMARY OF THE INVENTION

Accordingly, the present invention has been made keeping in mind the above problems occurring in the prior art, and an object of the present invention is to provide an apparatus and method that stabilizes the output sequence of a real random number generator by adjusting the input voltage of the random number generator or the comparative voltage of a comparator.

In accordance with an aspect of the present invention to accomplish the above object, there is provided an apparatus for stabilizing an output sequence of a real random number generator, including a verification unit for performing a monobit test on random number values sampled by and output from a comparison unit, and calculating an impact value; and an adjustment unit for adjusting a voltage of any one of a random number generation unit and the comparison unit using resulting values of the monobit test and the impact value output from the verification unit.

The verification unit may perform the monobit test using the following monobit test equation:

$$X = (n_0 - n_1)^2 / n$$

where X denotes calculated resulting values of the monobit test, $n_0$ denotes a number of 0's, $n_1$ denotes a number of 1's, and n denotes a total number of bits.

The impact value may become a negative (−) value when $(n_0 - n_1)$ is greater than 0 in the monobit test equation, whereas the impact value may become a positive (+) value when $(n_0 - n_1)$ is less than 0.

The adjustment unit may include a fuzzy function unit for fuzzifying the resulting values of the monobit test from the verification unit using a preset fuzzy function, a fuzzy engine unit for performing fuzzy inference by applying fuzzy values from the fuzzy function unit to a fuzzy rule; and a defuzzy function unit for converting the fuzzy values indicated by a fuzzy set by the fuzzy engine unit into numerical values corresponding to the fuzzy values.

The preset fuzzy function may be composed of values between probabilities of 0.95 and 0.99 of a chi-square distribution, and respective distribution values are 3.84 and 6.64.

The adjustment unit may output values, obtained by multiplying the values output from the defuzzy function unit by the impact value output from the verification unit, as adjustment values.

In accordance with another aspect of the present invention to accomplish the above object, there is provided a method for stabilizing an output sequence of a real random number generator, including performing, by a verification unit, a monobit test on random number values sampled by and output from a comparison unit, and calculating an impact value; and adjusting, by an adjustment unit, a voltage of any one of a random number generation unit and the comparison unit using resulting values of the monobit test and the impact value.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Figure 1:
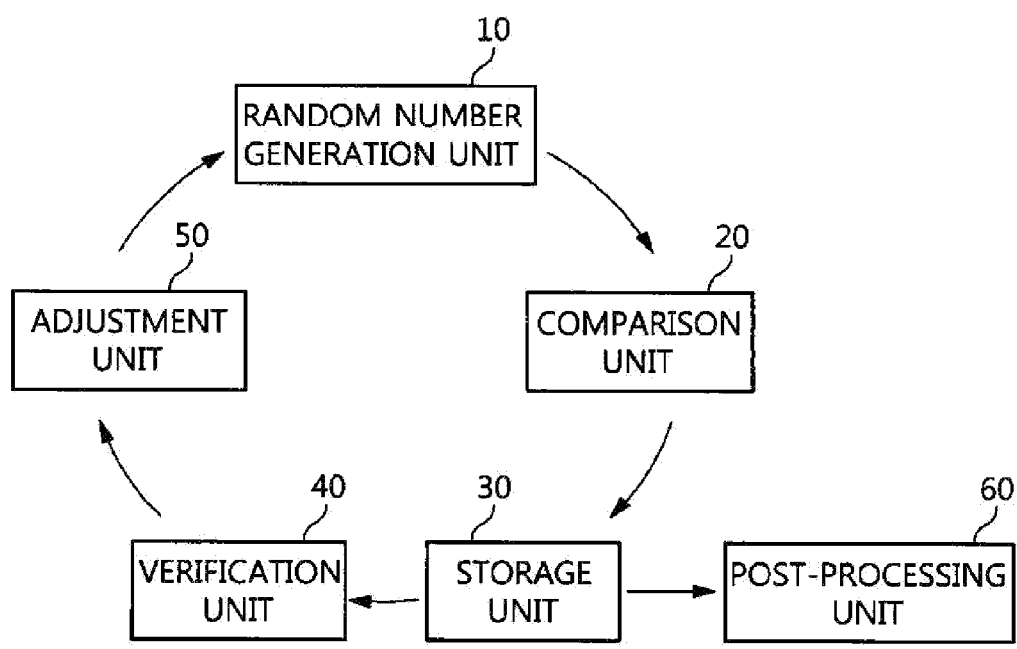
FIG. 1 is a configuration diagram showing an apparatus for stabilizing the output sequence of a real random number generator according to an embodiment of the present invention.

The present invention may be variously changed and may have various embodiments, and specific embodiments will be described in detail below with reference to the attached drawings.

However, it should be understood that those embodiments are not intended to limit the present invention to specific disclosure forms and they include all changes, equivalents or modifications included in the spirit and scope of the present invention.

The terms used in the present specification are merely used to describe specific embodiments and are not intended to limit the present invention. A singular expression includes a plural expression unless a description to the contrary is specifically pointed out in context. In the present specification, it should be understood that the terms such as "include" or "have" are merely intended to indicate that features, numbers, steps, operations, components, parts, or combinations thereof are present, and are not intended to exclude a possibility that one or more other features, numbers, steps, operations, components, parts, or combinations thereof will be present or added.

Unless differently defined, all terms used here including technical or scientific terms have the same meanings as the terms generally understood by those skilled in the art to which the present invention pertains. The terms identical to those defined in generally used dictionaries should be interpreted as having meanings identical to contextual meanings of the related art, and are not interpreted as being ideal or excessively formal meanings unless they are definitely defined in the present specification.

Embodiments of the present invention will be described in detail with reference to the accompanying drawings. In the following description of the present invention, the same reference numerals are used to designate the same or similar elements throughout the drawings and repeated descriptions of the same components will be omitted.

FIG. 1 is a configuration diagram showing an apparatus for stabilizing the output sequence of a real random number generator according to an embodiment of the present invention.

The apparatus for stabilizing the output sequence of a real random number generator according to the embodiment of the present invention includes a random number generation unit 10, a comparison unit 20, a storage unit 30, a verification unit 40, an adjustment unit 50, and a post-processing unit 60.

The random number generation unit 10 is a device composed of diodes that are analog noise sources, thermal noise, etc. to perform amplification. The random number generation unit 10 outputs pure analog signals. The random number generation unit 10 may include an initialization function, an output generation function, an update function, etc. The initialization function determines the initial value of operating status using an entropy input generated using noise. The operating status, which is data used to generate an output (random numbers) from the internal output generation function of an output generation function, is generated by the initialization function and is updated by the update function and the output generation function. The output generation function outputs random numbers using the operating status. Further, to prevent a predictive attack, the update function adds new entropy to the operating status. The entropy denotes a value determined using the probability distribution of results of a certain event. As the entropy is larger, it is more difficult to predict which value the corresponding variable becomes, and thus it may be considered that the randomness of the corresponding variable is high.

The comparison unit 20 compares an analog signal (random number values) output from the random number generation unit 10 with a specific voltage, and samples and outputs the analog signal at each preset period. For example, the comparison unit 20 may identify and sample bit patterns of "1" and "0".

The storage unit 30 stores random number values sampled and output by the comparison unit 20. For example, the storage unit 30 may store 200,000 or more bits.

The verification unit 40 calculates an impact value while performing a monobit test using the random number values stored in the storage unit 30.

Here, an equation for calculating the monobit test is given by the following equation:

$$X(n_0-n_1)^2/n$$

where X denotes the calculated resulting values of the monobit test, $n_0$ denotes the number of 0's, $n_1$ denotes the number of 1's, and n denotes the total number of bits.

Further, the impact value becomes a negative (−) value when $(n_0-n_1)$ is greater than 0 (zero) in the monobit test equation, whereas the impact value becomes a positive (+) value when $(n_0-n_1)$ is less than 0.

That is, the verification unit 40 performs the monobit test on a random number sequence (random numbers), which is generated by the random number generation unit 10 and is processed through the comparison unit 20 and the storage unit 30, and calculates a distribution of 1's and 0's. Further, the verification unit 40 obtains an impact value using the above-described scheme.

The adjustment unit 50 adjusts the voltage of the random number generation unit 10 or the comparison unit 20 using values (that is, the resulting values of the monobit test and the impact value) verified by the verification unit 40.

The post-processing unit 60 post-processes and outputs the random numbers stored in the storage unit 30.

Figure 2:
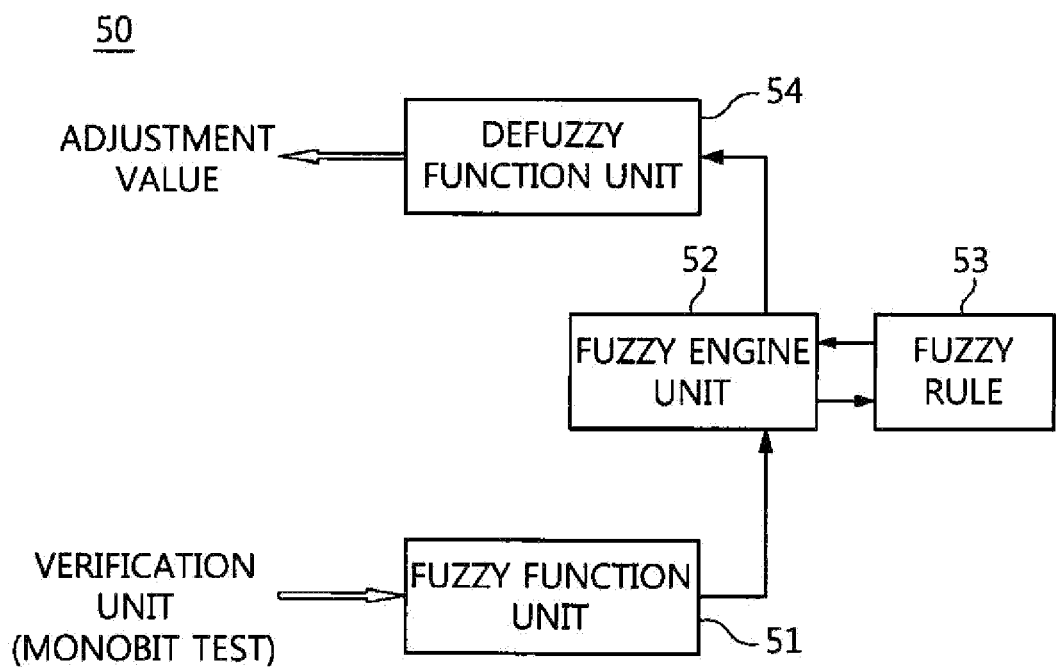
FIG. 2 is a diagram showing the internal configuration of an adjustment unit shown in FIG. 1.
Figures 3, 4:
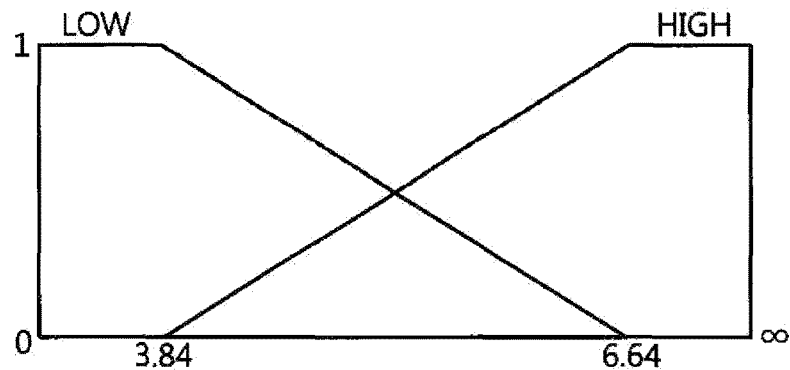
FIG. 3 is a diagram showing an example of a fuzzy function of a fuzzy function unit shown in FIG. 2.
FIG. 4 is a diagram showing an example of a fuzzy rule shown in FIG. 2.
Figure 5:
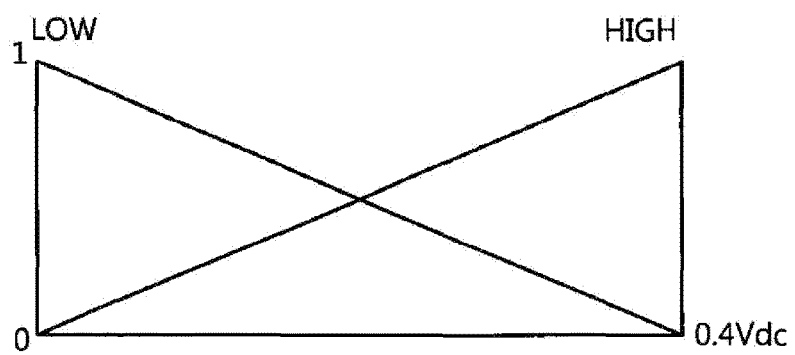
FIG. 5 is a diagram showing an example of a defuzzy function of a defuzzy function unit shown in FIG. 2.
Figure 6:
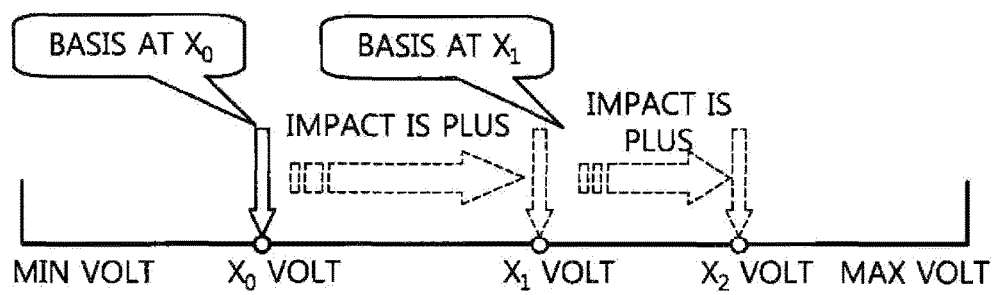
FIG. 6 is a diagram illustrating adjustment values from the adjustment unit shown in FIG. 1.

FIG. 2 is a diagram showing the internal configuration of the adjustment unit shown in FIG. 1, FIG. 3 is a diagram showing an example of a fuzzy function of a fuzzy function unit shown in FIG. 2, FIG. 3 is a diagram showing an example of a fuzzy function unit shown in FIG. 2, FIG. 4 is a diagram showing an example of a fuzzy rule shown in FIG. 2, FIG. 5 is a diagram showing an example of a defuzzy function of a defuzzy function unit shown in FIG. 2, and FIG. 6 is a diagram illustrating adjustment values from the adjustment unit shown in FIG. 1.

The adjustment unit 50 includes a fuzzy function unit 51, a fuzzy engine unit 52, and a defuzzy function unit 54.

The fuzzy function unit 51 fuzzifies the results of verification (e.g., the resulting values of the monobit test) by the verification unit 40 using a preset fuzzy function. Here, the preset fuzzy function is composed of values between probabilities of 0.95 and 0.99 of a chi-square distribution. As shown in FIG. 3, respective distribution values are 3.84 and 6.64. In this way, the fuzzy function unit 51 converts the results of verification by the verification unit 40 into a fuzzy set in which fuzzy inference, may be performed. Here, fuzzy inference is performed by the fuzzy engine unit 52.

The fuzzy engine unit 52 performs fuzzy inference by applying the fuzzified values (fuzzy values) from the fuzzy function unit 51 to the fuzzy rule 53. For example, as illustrated in FIG. 4, the fuzzy rule has the format of an antecedent part "IF" and a consequent part "THEN", and is configured such that, when an input value satisfying the condition of the antecedent part is received, the proposition of the consequent part is fulfilled. In other words, the fuzzy engine unit 52 converts the fuzzy values output from the fuzzy function unit 51 into a fuzzy set of an output space using the fuzzy rule 53.

The defuzzy function unit 54 converts the fuzzy values indicated by the fuzzy set by the fuzzy engine unit 52 into normal numerical values corresponding to the fuzzy values. Defuzzification has the inverse function of fuzzification. For example, the results of inference based on fuzzy logic in the fuzzy engine unit 52 may be a linguistic expression, and thus they must undergo a defuzzification procedure via the defuzzy function unit 54. Methods used in defuzzification may include methods using the maximum values of fuzzy sets of combined output units, methods using the average of individual maximum values, methods using the center of gravity (center of area method), etc. The defuzzy function unit 54 may adjust output values thereof by a maximum of 0.4 V at each time, as illustrated in FIG. 5.

The values output from the defuzzy function unit 54 are multiplied by the impact value and adjusted as illustrated in FIG. 6.

That is, the adjustment unit 50 outputs adjustment values by multiplying the values (numerical values) output from the internal defuzzy function unit 54 by the impact value output from the verification unit 40. Here, the adjustment values may be given, as illustrated in FIG. 6.

The adjustment values output from the adjustment unit 50 are used to adjust the input voltage of the random number generation unit 10 or to adjust the comparative voltage of the comparison unit 20.

Figure 7:
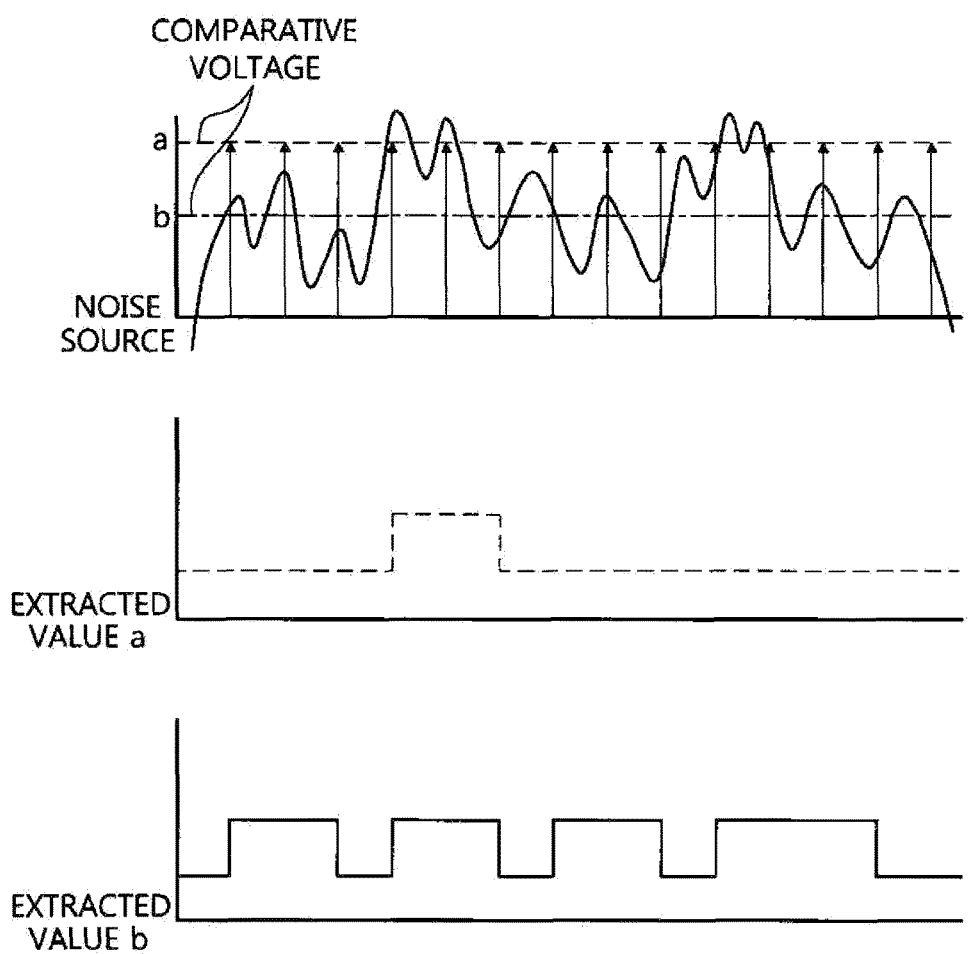
FIG. 7 is a diagram illustrating an output sequence stabilization scheme implemented via the adjustment of the comparative voltage of a comparison unit shown in FIG. 1.

FIG. 7 is a diagram illustrating an output sequence stabilization scheme implemented via the adjustment of the comparative voltage of the comparison unit shown in FIG. 1.

In FIG. 7, it can be seen that, when the comparative voltage of the comparison unit 20 is "a", relatively many 0's are output by referring to extracted value a. Therefore, it can be seen that when the comparative voltage of the comparison unit 20 is changed to "b" via the adjustment unit 50, 0's and 1's are uniformly distributed in extracted value 'b'. This means that the output sequence of the real random number generator is stabilized.

That is, FIG. 7 illustrates the results of decreasing the comparative voltage of the comparison unit 20. In this case, in the case of the comparative voltage 'a' of FIG. 7, the comparative voltage is a high, and thus there is a high probability that "0" will be output. In this case, uniform random number sequences may be obtained by decreasing the comparative voltage of the comparison unit 20.

Figure 8:
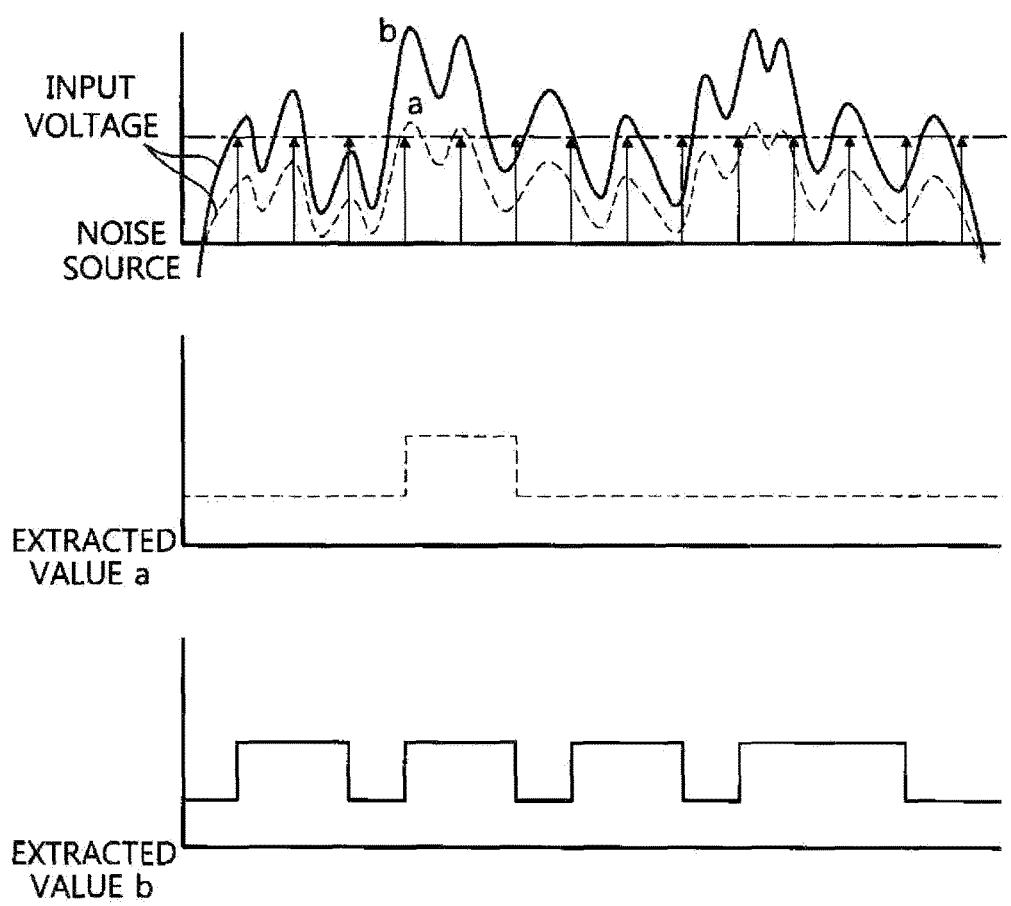
FIG. 8 is a diagram illustrating an output sequence stabilization scheme implemented via the adjustment of the input voltage of the random number generation unit shown in FIG. 1.

FIG. 8 is a diagram illustrating an output sequence stabilization scheme implemented via the adjustment of the input voltage of the random number generation unit shown in FIG. 1.

As shown in FIG. 8, it can be seen that, when the input voltage of the random number generation unit 10 is "a", relatively many 0's are output in extracted value a. Therefore, it can be seen that, when the input voltage of the random number generation unit 10 is changed to "b" via the adjustment unit 50, 0's and 1's are uniformly distributed in extracted value b. This means that the output sequence of the real random number generator is stabilized.

That is, FIG. 8 shows that the output of the noise source of the random number generation unit 10 is low, and thus the frequency of "0" may be high as in the extracted value a. In this case, by raising the input voltage of the random number generation unit 10, uniform random number sequences may be obtained.

Figure 9:
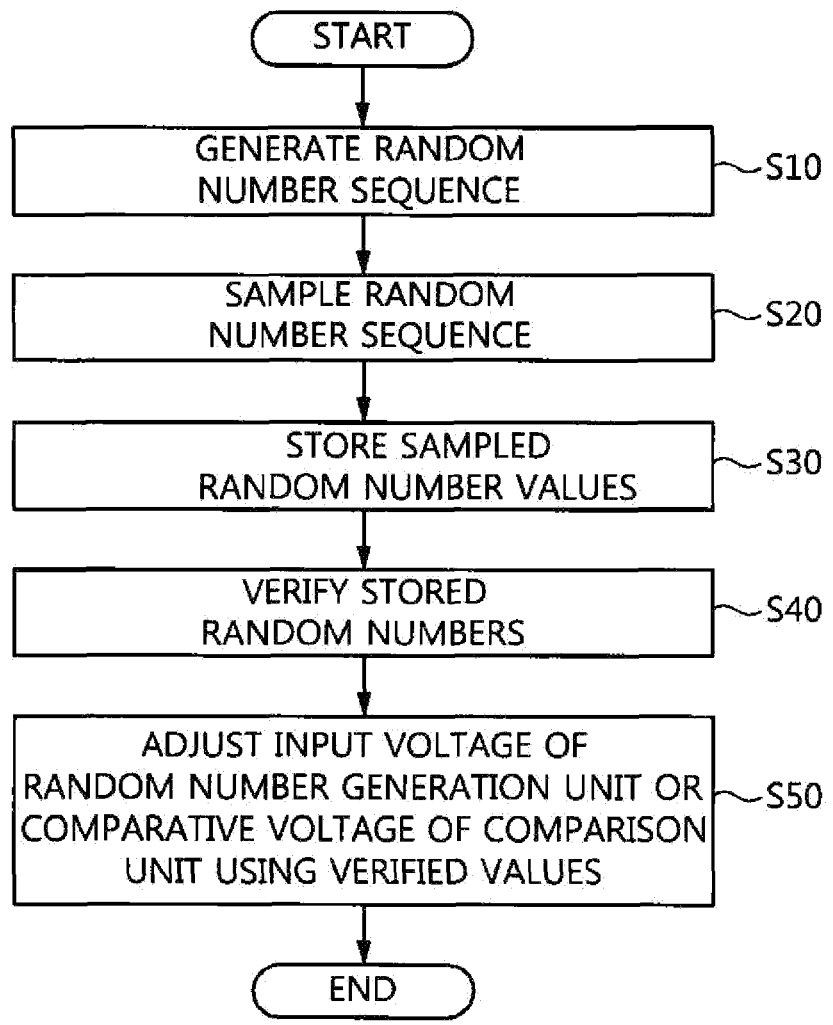
FIG. 9 is a flowchart showing a method for stabilizing the output sequence of a real random number generator according to an embodiment of the present invention.

FIG. 9 is a flowchart showing a method for stabilizing the output sequence of a real random number generator according to an embodiment of the present invention.

At step S10, the random number generation unit 10 generates a predetermined random number sequence (random number values). That is, the random number generation unit 10 generates a random number sequence (analog signal) based on a predetermined input value. The generated random number sequence is applied to the comparison unit 20.

Then, at step S20, the comparison unit 20 compares the analog signal (random number values) output from the random number generation unit 10 with a specific voltage, and then samples and outputs the analog signal at each preset period.

At step S30, the storage unit 30 stores the random number values sampled by and output from the comparison unit 20.

At step S40, the verification unit 40 verifies the random number values stored in the storage unit 30, performs a monobit test on the stored random number values, and obtains the resulting values of the monobit test while calculating an impact value.

Finally, at step S50, the adjustment unit 50 adjusts the input voltage of the random number generation unit 10 or the comparative voltage of the comparison unit 20 using the values verified by the verification unit 40 (that is, the resulting values of the monobit test and the impact value). That is, the adjustment unit 50 fuzzifies the resulting values of the monobit test output from the verification unit 40, performs fuzzy inference to generate a corresponding fuzzy set based on fuzzy inference, and defuzzifies the fuzzy set. Accordingly, the adjustment unit 50 converts fuzzy values indicated by the fuzzy set into normal numerical values corresponding to the fuzzy values. The adjustment unit 50 outputs adjustment values by multiplying the numerical values by the impact value output from the verification unit 40.

As the voltage of the random number generation unit 10 or the comparison unit 20 is adjusted using such adjustment values, uniform random number sequences may be stored in the storage unit 30, and the random number sequences stored in the storage unit 30 may be post-processed and output by the post-processing unit 60.

In accordance with the present invention having the above configuration, in the aging of equipment or malfunctioning of the equipment, the input voltage of a random number generator or the comparative voltage of a comparator is adjusted via self-diagnosis, so that the equipment may be maintained in the highest functioning state. Accordingly, the real random number generator that is maintained in the highest functioning state is not biased, and output sequences that are unpredictable and that have excellent randomness may be generated.

As described above, optimal embodiments of the present invention have been disclosed in the drawings and the specification. Although specific terms have been used in the present specification, these are merely intended to describe the present invention and are not intended to limit the meanings thereof or the scope of the present invention described in the accompanying claims. Therefore, those skilled in the art will appreciate that various modifications and other equivalent embodiments are possible from the embodiments. Therefore, the technical scope of the present invention should be defined by the technical spirit of the claims.

What is claimed is:

1. A real random number generator comprising:
a processor; and
one or more units comprising executable code configured and executed by the processor using algorithm associated with a non-transitory storage device,
wherein the one or more units comprise:
a verification unit for performing a monobit test on random number values sampled by and output from a comparison unit, and calculating an impact value; and
an adjustment unit for adjusting a voltage of any one of a random number generation unit and the comparison unit using resulting values of the monobit test and the impact value output from the verification unit,
wherein the adjustment unit comprises:
a fuzzy function unit for fuzzifying the resulting values of the monobit test from the verification unit using a preset fuzzy function;
a fuzzy engine unit for performing fuzzy inference by applying fuzzy values from the fuzzy function unit to a fuzzy rule; and
a defuzzy function unit for converting the fuzzy values indicated by a fuzzy set by the fuzzy engine unit into numerical values corresponding to the fuzzy values.

2. The real random number generator of claim 1, wherein the verification unit performs the monobit test using the following monobit test equation:

$$X=(n_0-n_1)^2/n$$

where X denotes calculation results of the monobit test, $n_0$ denotes a number of 0's, $n_1$ denotes a number of 1's, and n denotes a total number of bits.

3. The real random number generator of claim 2, wherein the impact value becomes a negative (−) value when $(n_0-n_1)$ is greater than 0 in the monobit test equation, whereas the impact value becomes a positive (+) value when $(n_0-n_1)$ is less, than 0.

4. The real random number generator of claim 1, wherein the preset fuzzy function is composed of values between probabilities of 0.95 and 0.99 of a chi-square distribution, and respective distribution values are 3.84 and 6.64.

5. The real random number generator of claim 1, wherein the adjustment unit outputs values, obtained by multiplying the values output from the defuzzy function unit by the impact value output from the verification unit, as adjustment values.

6. A method for stabilizing an output sequence of a real random number generator including a verification unit, a comparison unit, a random number generation unit and an adjustment unit, the method comprising:
performing, by the verification unit, a monobit test on random number values sampled by and output from the comparison unit, and calculating an impact value; and
adjusting, by the adjustment unit, a voltage of any one of the random number generation unit and the comparison unit using resulting values of the monobit test and the impact value, thereby stabilizing the output sequence of the real random number generator,
wherein the verification unit, comparison unit, and adjustment unit each comprise executable code configured and executed by a processor using algorithm associated with a non-transitory storage device, and
wherein adjusting the voltage comprises:
fuzzifying the resulting values of the monobit test using a preset fuzzy function;
performing fuzzy inference by applying fuzzy values obtained from fuzzifying to a fuzzy rule; and
converting the fuzzy values indicated by a fuzzy set by the fuzzy inference into numerical values corresponding to the fuzzy values.

7. The method of claim 6, wherein performing the monobit test and calculating the impact value comprises performing the monobit test using the following monobit test equation:

$$X=(n_0-n_1)^2/n$$

where X denotes calculation results of the monobit test, $n_0$ denotes a number of 0's, $n_1$ denotes a number of 1's, and n denotes a total number of bits.

8. The method of claim 7, wherein the impact value becomes a negative (−) value when $(n_0-n_1)$ is greater than 0 in the monobit test equation, whereas the impact value becomes a positive (+) value when $(n_0-n_1)$ is less than 0.

9. The method of claim 6, wherein the preset fuzzy function is composed of values between probabilities of 0.95 and 0.99 of a chi-square distribution, and respective distribution values are 3.84 and 6.64.

10. The method of claim 6, wherein adjusting the value further comprises outputting values, obtained by multiplying the numerical values by the impact value, as adjustment values.

* * * * *